United States Patent
Akatsuka (10) Patent No.: US 12,448,264 B2
(45) Date of Patent: Oct. 21, 2025

(54) ENGINE-TYPE INDUSTRIAL VEHICLE (71) Applicant: KABUSHIKI KAISHA TOYOTA JIDOSHOKKI, Kariya (JP)

(72) Inventor: Keisuke Akatsuka, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 248 days.

(21) Appl. No.: 18/098,373

(22) Filed: Jan. 18, 2023

(65) Prior Publication Data
US 2023/0227299 A1 Jul. 20, 2023

(30) Foreign Application Priority Data
Jan. 19, 2022 (JP) .................. 2022-006297

(51) Int. Cl.
*B66F 9/075* (2006.01)
*B66F 17/00* (2006.01)

(52) U.S. Cl.
CPC ........ *B66F 9/07572* (2013.01); *B66F 17/003* (2013.01)

(58) Field of Classification Search
CPC .................................................. B66F 9/07572
See application file for complete search history.

(56) References Cited

U.S. PATENT DOCUMENTS

| 7,561,954 B2 | 7/2009 | Aizawa et al. |
| 8,965,561 B2 | 2/2015 | Jacobus et al. |
| 10,118,602 B2 * | 11/2018 | Fischer ............... F02N 11/0822 |
| 2007/0084450 A1 | 4/2007 | Oka et al. |
| 2015/0337877 A1 * | 11/2015 | Miyamoto ............... B60L 7/18 60/413 |
| 2016/0180713 A1 | 6/2016 | Bernhardt et al. |

(Continued)

FOREIGN PATENT DOCUMENTS

| CA | 3 159 403 A | 11/2020 |
| EP | 3035074 A1 | 6/2016 |

(Continued)

OTHER PUBLICATIONS

Extended European Search Report dated Jun. 5, 2023 in European Application No. 23151713.7.

(Continued)

*Primary Examiner* — Shelley Chen
(74) *Attorney, Agent, or Firm* — Sughrue Mion, PLLC (57) ABSTRACT

An engine-type industrial vehicle includes: an engine; a power transmission configured to transmit a driving force of the engine to a driving wheel; a controller configured to adjust the driving force; a travel direction determiner configured to determine a travel direction of the engine-type industrial vehicle; and an object detector configured to detect a position of an object in the travel direction of the engine-type industrial vehicle. The power transmission is switchable between a driving force transmission state and a driving force non-transmission state. The controller causes a state of the engine-type industrial vehicle to be in a travel start prohibition state, when the object detector detects the object and a detection direction of the object matches the travel direction, in a case where a vehicle speed of the engine-type industrial vehicle is equal to or less than a stop determination threshold.

6 Claims, 5 Drawing Sheets

(56) References Cited

U.S. PATENT DOCUMENTS

| | | | | |
|---|---|---|---|---|
| 2016/0304095 A1* | 10/2016 | Fischer | ............... | B60W 10/188 |
| 2018/0057049 A1* | 3/2018 | Stewart | ................... | B66F 9/063 |
| 2019/0118818 A1* | 4/2019 | Koide | ................... | F16H 61/682 |
| 2020/0001917 A1 | 1/2020 | Stewart et al. | | |
| 2020/0180690 A1 | 6/2020 | Stewart et al. | | |
| 2021/0179082 A1* | 6/2021 | Hara | ..................... | B60W 50/14 |
| 2022/0185171 A1 | 6/2022 | Kubotani | | |
| 2022/0411246 A1* | 12/2022 | Kubotani | ............. | B66F 17/003 |

FOREIGN PATENT DOCUMENTS

| | | | | | |
|---|---|---|---|---|---|
| EP | 3754451 A1 | * | 12/2020 | ............. | B60K 35/00 |
| EP | 3754451 B1 | * | 3/2022 | ............. | B60K 35/00 |
| EP | 4071102 A1 | | 10/2022 | | |
| JP | 03292223 A | | 12/1991 | | |
| JP | 2004189031 A | | 7/2004 | | |
| JP | 3599009 B2 | * | 12/2004 | | |
| JP | 2007-119246 A | | 5/2007 | | |
| JP | 2011037318 A | | 2/2011 | | |
| JP | 3191518 U | | 6/2014 | | |
| JP | 2018-3642 A | | 1/2018 | | |
| JP | 2020203618 A | | 12/2020 | | |
| JP | 2021-95079 A | | 6/2021 | | |
| JP | 2021093124 A | * | 6/2021 | ........ | B60W 30/0953 |
| JP | 2022-094177 A | | 6/2022 | | |
| WO | WO-2010109676 A1 | * | 9/2010 | ............. | B62D 6/001 |
| WO | WO-2011096072 A1 | * | 8/2011 | ............. | B60T 8/1755 |

OTHER PUBLICATIONS

Canadian Office Action issued May 17, 2024 in Application No. 3,186,454.
Japanese Office Action dated Apr. 1, 2025 in Application No. 2022-006297.
Korean Office Action dated Apr. 15, 2025 in Application No. 10-2023-0005877.
Office Action issued Mar. 13, 2025 in European Patent Application No. 23 151 713.7.
Communication issued Aug. 19, 2025 in Indian Application No. 202344003075.
Japanese Office Action issued Sep. 9, 2025, JP2022-006297.

* cited by examiner

ENGINE-TYPE INDUSTRIAL VEHICLE

CROSS-REFERENCE TO RELATED APPLICATION

This application claims priority to Japanese Patent Application No. 2022-006297 filed on Jan. 19, 2022, the entire disclosure of which is incorporated herein by reference.

BACKGROUND ART

The present disclosure relates to an engine-type industrial vehicle.

An industrial vehicle disclosed in Japanese Patent Application Publication No. 2021-093124 includes a controller, an object detector, and a direction sensor. The controller controls the industrial vehicle. The object detector detects a position of an object. The direction sensor detects an operation direction of a direction lever instructing a travel direction. The direction sensor detects whether the direction lever is operated in a direction indicating a forward travel or a direction indicating a rearward travel, with respect to a neutral position as a reference position. When an object exists in the travel direction of the industrial vehicle at a time of a travel start of the industrial vehicle, the controller prohibits the travel start of the industrial vehicle.

In an engine-type industrial vehicle traveling with an engine, when the direction lever is operated in a position other than the neutral position, the engine-type industrial vehicle travels due to a creep phenomenon. For this reason, the engine-type industrial vehicle starts to travel even when an object exists in the travel direction, which may cause a contact between the object and the engine-type industrial vehicle. This deteriorates work efficiency. Thus, it is required to appropriately suppress the contact between the object and the engine-type industrial vehicle when the engine-type industrial vehicle starts to travel.

SUMMARY

In accordance with an aspect of the present disclosure, there is provided an engine-type industrial vehicle including: an engine; a power transmission configured to transmit a driving force of the engine to a driving wheel; and a controller configured to adjust the driving force transmitted to the driving wheel. The engine-type industrial vehicle includes: a travel direction determiner configured to determine a travel direction of the engine-type industrial vehicle; and an object detector configured to detect a position of an object existing in the travel direction of the engine-type industrial vehicle. The power transmission is switchable between a driving force transmission state where the driving force of the engine is transmitted to the power transmission and a driving force non-transmission state where the driving force of the engine is not transmitted to the power transmission. The controller causes a state of the engine-type industrial vehicle to be in a travel start prohibition state, when the object detector detects the object and a detection direction of the object matches the travel direction determined by the travel direction determiner, in a case where a vehicle speed of the engine-type industrial vehicle is equal to or less than a stop determination threshold. The travel start prohibition state includes at least one of a state where the power transmission is in the driving force non-transmission state and a state where a braking force is applied to the engine-type industrial vehicle.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the embodiments together with the accompanying drawings in which.

DETAILED DESCRIPTION OF THE EMBODIMENTS

The following will describe an embodiment of an engine-type industrial vehicle.

Forklift Truck

Figure 1:
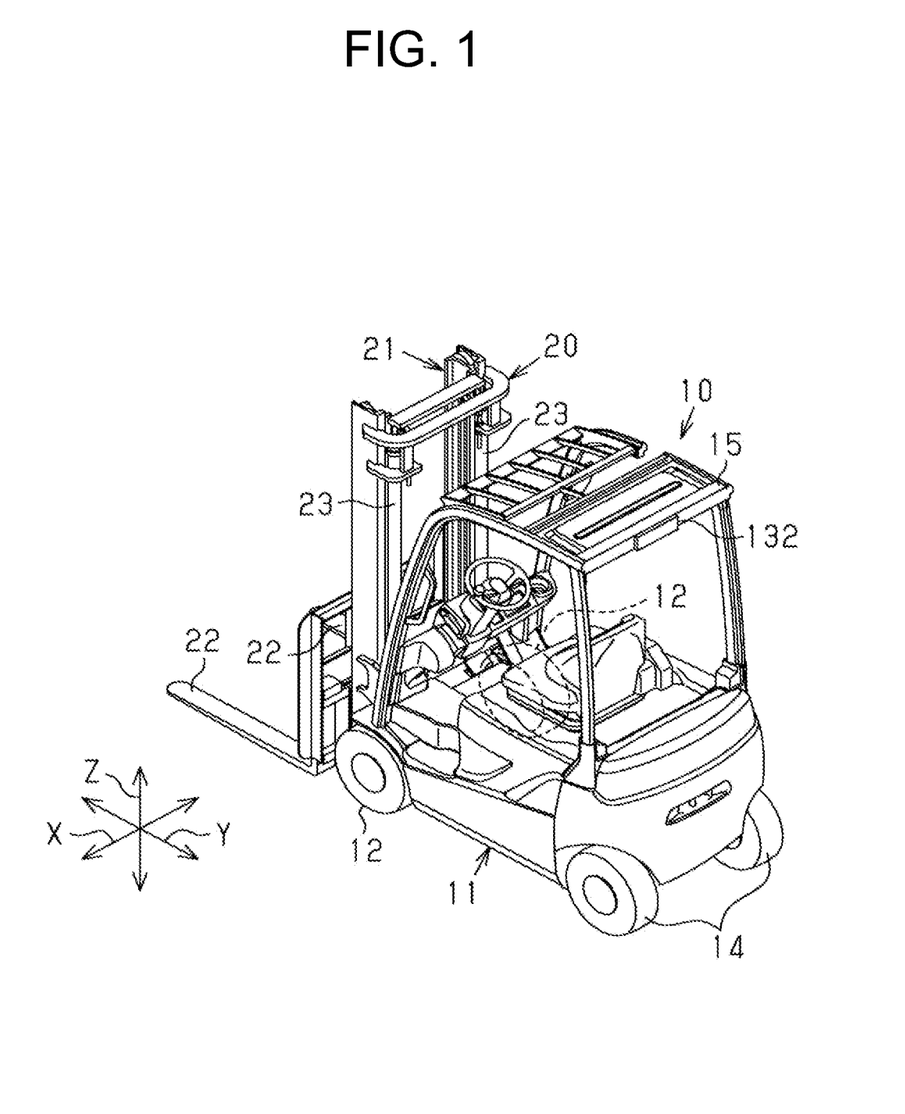
FIG. 1 is a perspective view of a forklift truck.

As illustrated in FIG. 1, a forklift truck 10 serving as the engine-type industrial vehicle includes a vehicle body 11, two driving wheels 12, two steering wheels 14, and a cargo handling apparatus 20. In the following description, terms of "front/rear", "forward/rearward", and "right/left" indicate orientations of the forklift truck 10.

The vehicle body 11 includes a head guard 15 provided above a driver seat. The two driving wheels 12 are arranged in a lower front part of the vehicle body 11, and spaced from each other in a vehicle width direction.

The two steering wheels 14 are arranged in a lower rear part of the vehicle body 11, and spaced from each other in the vehicle width direction.

Cargo Handling Apparatus

The cargo handling apparatus 20 includes a mast 21, a pair of forks 22, and a lift cylinder 23. The mast 21 is provided in a front part of the vehicle body 11. The pair of forks 22 is movable up and down with the mast 21. A cargo is loaded on the pair of forks 22. The lift cylinder 23 is a hydraulic cylinder. The lift cylinder 23 is extendable and contractable to cause the mast 21 to move up and down. When the mast 21 moves up and down, the pair of forks 22 moves up and down accordingly. In the forklift truck 10 of the present embodiment, a driver performs a traveling operation and a cargo handling operation.

Configuration of Forklift Truck

Figure 2:
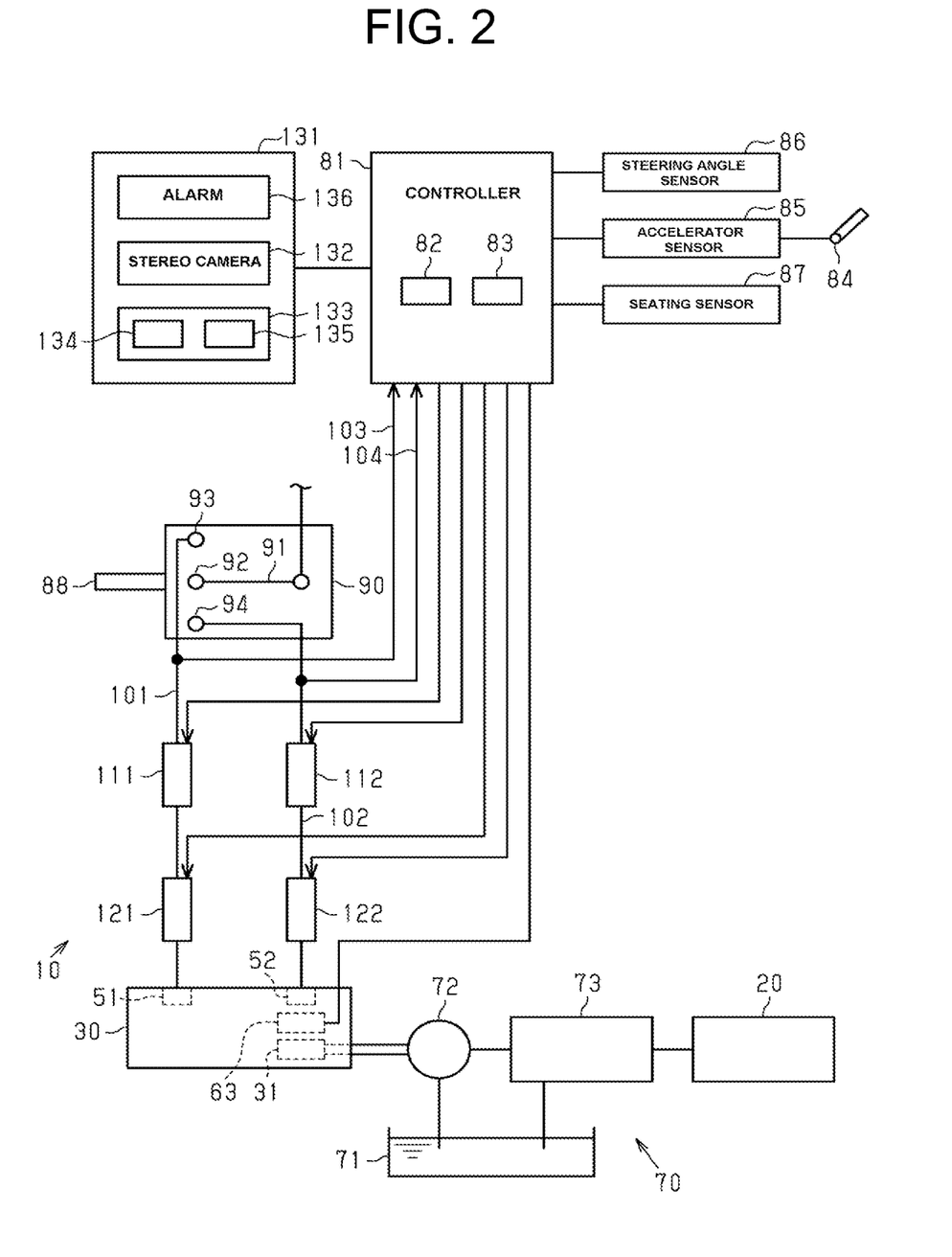
FIG. 2 is a schematic block diagram of the forklift truck.

As illustrated in FIG. 2, the forklift truck 10 includes a travel system 30, a cargo handling system 70, a controller 81, an accelerator 84, an accelerator sensor 85, a steering angle sensor 86, a seating sensor 87, a direction lever 88, a direction switch 90, a forward connection line 101, a rearward connection line 102, a forward detection line 103, a rearward detection line 104, a first forward relay 111, a first rearward relay 112, a second forward relay 121, a second rearward relay 122, and an object detector 131.

Travel System

Figure 3:
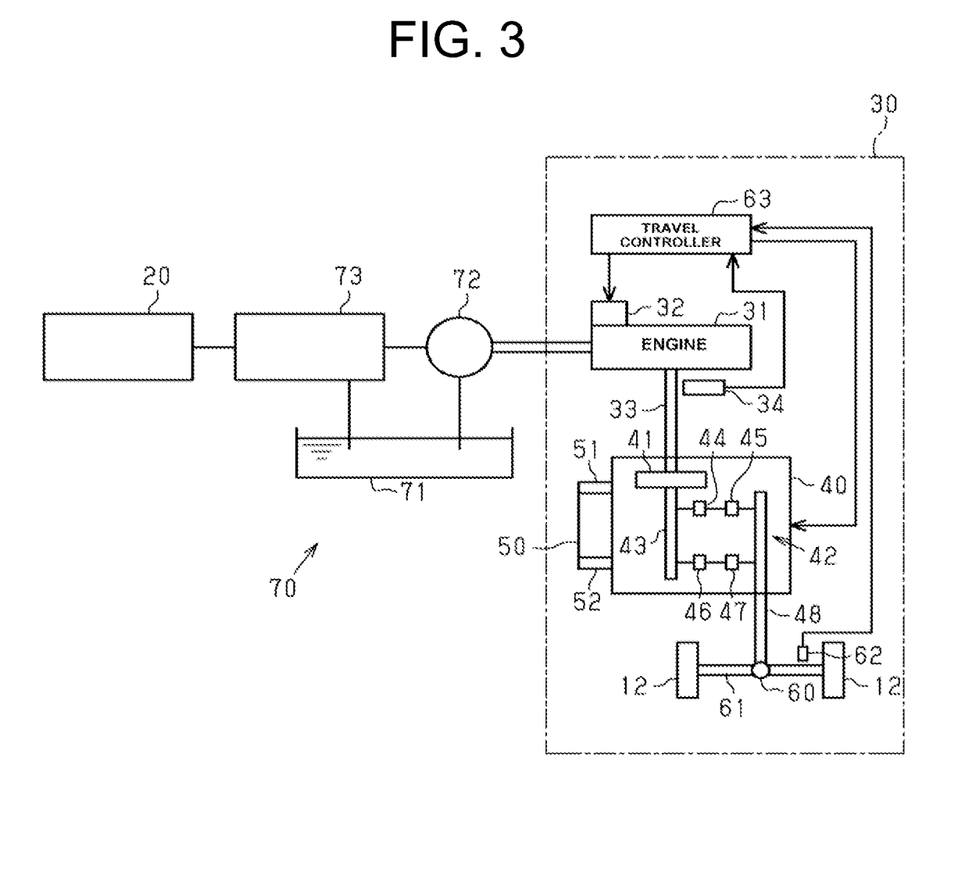
FIG. 3 is a schematic block diagram of a travel system and a cargo handling system.

As illustrated in FIG. 3, the travel system 30 is a mechanism for a travel of the forklift truck 10. The travel system 30 includes an engine 31, an output shaft 33, a rotational speed sensor 34, a power transmission 40, a solenoid valve 50, a forward solenoid 51, a rearward solenoid 52, a differential 60, an axle 61, a vehicle speed sensor 62, and a travel controller 63.

Engine

The engine 31 is a drive source for the traveling operation and the cargo handling operation of the forklift truck 10. The engine 31 of the present embodiment is a gasoline engine using gasoline as a fuel. The engine 31 includes a throttle actuator 32. The throttle actuator 32 adjusts a throttle opening degree of a throttle valve (not illustrated) provided in an intake passage such that a rotational speed of the engine 31 follows a target rotational speed of the engine 31 calculated from an opening degree of the accelerator 84. The throttle actuator 32 adjusts the throttle opening degree to adjust an amount of air supplied to the engine 31. Thus, the rotational speed of the engine 31 is controlled. The engine 31 may be a diesel engine using diesel oil as a fuel, or may be an engine using liquefied petroleum gas or compressed natural gas as a fuel. The output shaft 33 is connected to the engine 31. The output shaft 33 rotates in response to a drive of the engine 31.

Rotational Speed Sensor

The rotational speed sensor 34 is provided in the output shaft 33. The rotational speed sensor 34 detects the rotational speed of the engine 31. The rotational speed of the engine 31 corresponds to a rotational speed of the output shaft 33. The rotational speed sensor 34 outputs an electric signal in accordance with the rotational speed of the output shaft 33 to the travel controller 63.

Power Transmission

The power transmission 40 is configured to transmit a driving force of the engine 31 to the driving wheels 12. The power transmission 40 includes a torque converter 41 and a transmission 42.

Torque Converter

The torque converter 41 is connected to the output shaft 33. The driving force of the engine 31 is transmitted to the torque converter 41 through the output shaft 33. The torque converter 41 includes a pump connected to the output shaft 33, and a turbine. In the torque converter 41, hydraulic oil discharged from the pump rotates the turbine.

Transmission

The transmission 42 includes an input shaft 43, a forward clutch 44, a forward gear train 45, a reverse clutch 46, a reverse gear train 47, and an output shaft 48. The input shaft 43 is connected to the torque converter 41. A driving force is transmitted from the torque converter 41 to the transmission 42 through the input shaft 43.

Forward Clutch and Reverse Clutch

The forward clutch 44 is provided in the input shaft 43. The forward gear train 45 is provided between the forward clutch 44 and the output shaft 48. The forward clutch 44 is switched between a connection state and a disconnection state. The connection state is a state where the input shaft 43 is connected to the forward gear train 45. The disconnection state is a state where the input shaft 43 is disconnected from the forward gear train 45. When the input shaft 43 is connected to the forward gear train 45 via the forward clutch 44, the driving force is transmitted from the input shaft 43 to the forward gear train 45. Then, the driving force transmitted to the forward gear train 45 is transmitted to the output shaft 48. When the forward clutch 44 is connected to the forward gear train 45, the driving force of the engine 31 is transmitted to the output shaft 48. When the forward clutch 44 is disconnected from the forward gear train 45, the driving force is not transmitted from the input shaft 43 to the forward gear train 45. A hydraulic clutch is used as the forward clutch 44. The hydraulic clutch may be a multi-plate wet clutch, for example.

The reverse clutch 46 is provided in the input shaft 43. The reverse gear train 47 is provided between the reverse clutch 46 and the output shaft 48. The reverse clutch 46 is switched between a connection state and a disconnection state. The connection state is a state where the input shaft 43 is connected to the reverse gear train 47. The disconnection state is a state where the input shaft 43 is disconnected from the reverse gear train 47. When the input shaft 43 is connected to the reverse gear train 47 via the reverse clutch 46, the driving force is transmitted from the input shaft 43 to the reverse gear train 47. Then, the driving force transmitted to the reverse gear train 47 is transmitted to the output shaft 48. When the reverse clutch 46 is connected to the reverse gear train 47, the driving force of the engine 31 is transmitted to the output shaft 48. When the reverse clutch 46 is disconnected from the reverse gear train 47, the driving force is not transmitted from the input shaft 43 to the reverse gear train 47. A hydraulic oil clutch is used as the reverse clutch 46. The hydraulic clutch may be a multi-plate wet clutch, for example.

Solenoid Valve

The solenoid valve 50 controls a supply and a discharge of the hydraulic oil to and from the forward clutch 44 and the reverse clutch 46, which switches a state of each of the clutches 44, 46 between the connection state and the disconnection state.

Forward Solenoid and Rearward Solenoid

The solenoids 51, 52 switch the supply and the discharge of the hydraulic oil to and from the clutches 44, 46 by the solenoid valve 50. When the forward solenoid 51 is energized, the hydraulic oil is supplied from the solenoid valve 50 to the forward clutch 44. When the hydraulic oil is supplied to the forward clutch 44, the forward clutch 44 is in the connection state. When the rearward solenoid 52 is energized, the hydraulic oil is supplied from the solenoid valve 50 to the reverse clutch 46. When the hydraulic oil is supplied to the reverse clutch 46, the reverse clutch 46 is in the connection state.

The solenoid valve 50 may be a single solenoid directional switching valve. When the forward solenoid 51 is energized, a spool of the electromagnetic directional switching valve is switched to a position where the hydraulic oil is supplied to the forward clutch 44. When the rearward solenoid 52 is energized, the spool of the solenoid directional switching valve is switched to a position where the hydraulic oil is supplied to the reverse clutch 46. When the forward solenoid 51 and the rearward solenoid 52 are de-energized, the spool of the electromagnetic directional switching valve is switched to a position where the hydraulic oil is discharged from the clutches 44, 46. The hydraulic oil for operating the forward clutch 44 and reverse clutch 46 is supplied to the forward clutch 44 and reverse clutch 46 by a hydraulic pump positioned inside the power transmission 40. The hydraulic pump has a known configuration.

Two solenoid valves may be used as the solenoid valve 50. The two solenoid valves are provided in correspondence with the forward clutch 44 and the reverse clutch 46, respectively. In this case, each of the forward solenoid 51 and the rearward solenoid 52 controls the solenoid valve 50, individually, so that the hydraulic oil is supplied to and discharged from the clutches 44, 46.

Driving Force Transmission State and Driving Force Non-Transmission State

The power transmission 40 is switchable between a driving force transmission state where the driving force of the engine 31 is transmitted to the power transmission 40 and a driving force non-transmission state where the driving force of the engine 31 is not transmitted to the power transmission 40. When one of the forward clutch 44 and the reverse clutch 46 is in the connection state, the driving force of the engine 31 is transmitted to the power transmission 40, thereby causing the forklift truck 10 to travel. The driving force transmission state corresponds to a state where one of the forward clutch 44 and the reverse clutch 46 is in the connection state. When the forward clutch 44 and the reverse clutch 46 are in the disconnection state, the driving force of the engine 31 is not transmitted to the power transmission 40. The driving force non-transmission state corresponds to a state where the forward clutch 44 and the reverse clutch 46 are in the disconnection state.

Differential and Axle

The differential 60 is connected to the output shaft 48. The axle 61 is connected to the differential 60. The driving wheels 12 are connected to the axle 61. The axle 61 rotates in response to the rotation of the output shaft 48. The driving wheels 12 rotate in response to the rotation of the axle 61, thereby causing the forklift truck 10 to travel. When the forward clutch 44 is connected to the forward gear train 45, the forklift truck 10 travels forward. When the reverse clutch 46 is connected to the reverse gear train 47, the forklift truck 10 travels rearward.

Vehicle Speed Sensor

The vehicle speed sensor 62 is a sensor for detecting a vehicle speed of the forklift truck 10. The vehicle speed sensor 62 is provided in the output shaft 48, the axle 61, or the like, for example. The vehicle speed sensor 62 outputs a pulse signal in accordance with the vehicle speed of the forklift truck 10 to the travel controller 63.

Travel Controller

The travel controller 63 is an engine control unit configured to control the engine 31. The travel controller 63 controls the throttle actuator 32 to adjust the throttle opening degree. The throttle opening degree is adjusted, so that the driving force of the engine 31 is adjusted.

Cargo Handling System

The cargo handling system 70 is a mechanism for operating the cargo handling apparatus 20. The cargo handling system 70 includes an oil tank 71 storing the hydraulic oil, a hydraulic pump 72, and a hydraulic mechanism 73.

Hydraulic Pump

The hydraulic pump 72 is driven by the engine 31. The hydraulic pump 72 pumps the hydraulic oil from the oil tank 71. The pumped hydraulic oil is supplied to the hydraulic mechanism 73.

Hydraulic Mechanism

The hydraulic mechanism 73 includes a control valve. The control valve controls a supply and a discharge of the hydraulic oil to and from hydraulic devices. Examples of the hydraulic devices include a tilt cylinder tilting the lift cylinder 23, the cargo handling apparatus 20, and the like. The cargo handling apparatus 20 is operated by the supply or the discharge of the hydraulic oil. The hydraulic devices may be provided in the vehicle body 11 as long as the hydraulic devices are provided in the forklift truck 10.

Controller

As illustrated in FIG. 2, the controller 81 includes a processor 82 and a memory 83. The processor 82 is a CPU (Central Processing Unit), a GPU (Graphics Processing Unit), a DSP (Digital Signal Processor), or the like, for example. The memory 83 includes a RAM (Random Access Memory) and a ROM (Read Only Memory). The memory 83 stores program codes or commands configured to cause the processor 82 to execute processes. The memory 83, that is, a computer readable medium, includes any available medium that is accessible by a general purpose computer or a dedicated computer. The controller 81 may include a hardware circuit such as an ASIC (Application Specific Integrated Circuit) or an FPGA (Field Programmable Gate Array). The controller 81, which is a processing circuit, may include one or more processors for operating in accordance with computer programs, one or more hardware circuits such as the ASIC or the FPGA, or a combination thereof.

Accelerator Sensor

The accelerator sensor 85 detects an operation amount of the accelerator 84. The operation amount of the accelerator 84 corresponds to an accelerator opening degree. The accelerator sensor 85 outputs an electric signal in accordance with the accelerator opening degree to the controller 81. The controller 81 can recognize the accelerator opening degree upon reception of the electric signal from the accelerator sensor 85.

Steering Angle Sensor

The steering angle sensor 86 detects a steering angle of each steering wheel 14. The steering angle sensor 86 outputs an electric signal in accordance with the steering angle to the controller 81. The controller 81 can recognize the steering angle by the electric signal from the steering angle sensor 86.

Seating Sensor

The seating sensor 87 is configured to be in ON state when a driver is seated on the driver seat. The seating sensor 87 is provided under the driver seat, for example. Examples of the seating sensor 87 include a switch, a pressure-sensitive sensor, an weight sensor, an optical sensor, and a camera.

Direction Lever

The direction lever 88 determines a travel direction of the forklift truck 10. The direction lever 88 is operated by the driver of the forklift truck 10. The direction lever 88 is operated to be in a forward position indicating a forward travel or a rearward position indicating a rearward travel, when a neutral position is defined as a reference position. For example, the forward position is a position where the direction lever 88 is tilted forward from the neutral position, and the rearward position is a position where the direction lever 88 is tilted rearward from the neutral position. The direction lever 88 serves as a travel direction determiner.

Direction Switch

The direction switch 90 is switched depending on an operation direction of the direction lever 88. The direction switch 90 includes one movable contact 91, and three fixed contacts 92, 93, 94. The movable contact 91 is connected to a positive electrode of a battery mounted on the forklift truck 10. The three fixed contacts 92, 93, 94 correspond to a neutral fixed contact 92, a forward fixed contact 93, and a rearward fixed contact 94, respectively. When the direction lever 88 is in the neutral position, the movable contact 91 is connected to the neutral fixed contact 92. When the direction lever 88 is in the forward position, the movable contact 91 is connected to the forward fixed contact 93. When the direction lever 88 is in the rearward position, the movable contact 91 is connected to the rearward fixed contact 94.

Forward Connection Line and Rearward Connection Line

The forward connection line 101 connects the forward fixed contact 93 and the forward solenoid 51. When the movable contact 91 is connected to the forward fixed contact 93, the forward connection line 101 is electrically connected to the battery. As a result, the forward solenoid 51 is energized. When the movable contact 91 is connected to the forward fixed contact 93, the rearward solenoid 52 is de-energized.

The rearward connection line 102 connects the rearward fixed contact 94 and the rearward solenoid 52. When the movable contact 91 is connected to the rearward fixed contact 94, the rearward connection line 102 is electrically connected to the battery. As a result, the rearward solenoid 52 is energized. When the movable contact 91 is connected to the rearward fixed contact 94, the forward solenoid 51 is de-energized.

When the direction lever 88 is in the forward position, the forward solenoid 51 is energized to supply the hydraulic oil to the forward clutch 44. As a result, the forklift truck 10 travels forward. When the direction lever 88 is in the rearward position, the rearward solenoid 52 is energized to supply the hydraulic oil to the reverse clutch 46. As a result, the forklift truck 10 travels rearward. When the direction lever 88 is in the neutral position, the solenoids 51, 52 are de-energized. Thus, the hydraulic oil is not supplied to the clutches 44, 46. In this case, the driving force of the engine 31 is not transmitted to the power transmission 40.

Forward Detection Line and Rearward Detection Line

The forward detection line 103 connects the forward connection line 101 and the controller 81. When a voltage is applied from the battery to the forward connection line 101, the voltage is applied to the controller 81 through the forward detection line 103. The rearward detection line 104 connects the rearward connection line 102 and the controller 81. When the voltage is applied from the battery to the rearward connection line 102, the voltage is applied to the controller 81 through the rearward detection line 104. When the voltage is inputted from the forward detection line 103, the controller 81 determines that the direction lever 88 is in the forward position. When the voltage is inputted from the rearward detection line 104, the controller 81 determines that the direction lever 88 is in the rearward position. When the voltage is not inputted from any of the forward detection line 103 and the rearward detection line 104, the controller 81 determines that the direction lever 88 is in the neutral position.

First Forward Relay and First Rearward Relay

The first forward relay 111 is provided in the forward connection line 101. The first forward relay 111 is switched between a connection state and a disconnection state. When the first forward relay 111 is in the connection state, the forward connection line 101 is electrically connected to the forward solenoid 51. When the first forward relay 111 is in the disconnection state, the forward connection line 101 is electrically disconnected from the forward solenoid 51. The first rearward relay 112 is provided in the rearward connection line 102. The first rearward relay 112 is switched between a connection state and a disconnection state. When the first rearward relay 112 is in the connection state, the rearward connection line 102 is electrically connected to the rearward solenoid 52. When the first rearward relay 112 is in the disconnection state, the rearward connection line 102 is electrically disconnected from the rearward solenoid 52.

The controller 81 causes each of the first forward relay 111 and the first rearward relay 112 to be switched between the connection state and the disconnection state. When the seating sensor 87 detects the driver seated on the driver seat, the controller 81 causes each of the first forward relay 111 and the first rearward relay 112 to be in the connection state. When the seating sensor 87 has not detected the driver seated on the driver seat for a predetermined period of time or more, the controller 81 causes each of the first forward relay 111 and the first rearward relay 112 to be in the disconnection state. An arbitrary time may be set as the predetermined time. When each of the first forward relay 111 and the first rearward relay 112 is in the disconnection state, the solenoids 51, 52 are de-energized regardless of the position of the direction lever 88. As a result, the driving force of the engine 31 is not transmitted to the power transmission 40. That is, the power transmission 40 is switched to be in the driving force non-transmission state.

Second Forward Relay and Second Rearward Relay

The second forward relay 121 is provided in the forward connection line 101. The second forward relay 121 is switched between a connection state and a disconnection state. When the second forward relay 121 is in the connection state, the forward connection line 101 is electrically connected to the forward solenoid 51. When the second forward relay 121 is in the disconnection state, the forward connection line 101 is electrically disconnected from the forward solenoid 51. The second rearward relay 122 is provided in the rearward connection line 102. The second rearward relay 122 is switched between a connection state and a disconnection state. When the second rearward relay 122 is in the connection state, the rearward connection line 102 is electrically connected to the rearward solenoid 52. When the second rearward relay 122 is in the disconnection state, the rearward connection line 102 is electrically disconnected from the rearward solenoid 52.

The controller 81 causes the second forward relay 121 and the second rearward relay 122 to be switched between the connection state and the disconnection state. When a switchback operation is not performed, the controller 81 causes each of the second forward relay 121 and the second rearward relay 122 to be in the connection state. When the switchback operation is performed, the controller 81 causes each of the second forward relay 121 and the second rearward relay 122 to be in the disconnection state. The switchback operation means that the direction lever 88 is operated to switch the travel direction from the forward travel to the rearward travel or from the rearward travel to the forward travel. When the travel direction instructed by the direction lever 88 does not coincide with the travel direction of the forklift truck 10, the controller 81 determines that the switchback operation is performed. When each of the second forward relay 121 and the second rearward relay 122 is in the disconnection state, the solenoids 51, 52 are de-energized regardless of the position of the direction lever 88. As a result, the driving force of the engine 31 is not transmitted to the power transmission 40. That is, the power transmission 40 is switched to be in the driving force non-transmission state.

Object Detector

The object detector 131 includes a stereo camera 132, a detector 133, and an alarm 136. The stereo camera 132 including two cameras captures an image. As illustrated in FIG. 1, the stereo camera 132 is disposed in the head guard 15. The stereo camera 132 is disposed so that the road surface on which the forklift truck 10 travels can be seen from above the forklift truck 10. The stereo camera 132 of the present embodiment captures an image of an area behind the forklift truck 10. Thus, the object detected by the object detector 131 corresponds to an object existing behind the forklift truck 10. A detection direction by the object detector 131 corresponds to the area behind the forklift truck 10. The alarm 136 and the detector 133 may be unitized with the stereo camera 132 and disposed in the head guard 15 together with the stereo camera 132. The alarm 136 and the detector 133 may be disposed at a position different from the head guard 15.

The detector 133 includes a processor 134 and a memory 135. The processor 134 is a CPU, a GPU, or a DSP, for example. The memory 135 includes a RAM and a ROM. The memory 135 stores various programs for detecting an object in an image captured by the stereo camera 132. The memory 135 stores program codes or commands configured to cause the processor 134 to execute processes. The memory 135, that is, a computer readable medium, includes any available medium that is accessible by a general purpose computer or a dedicated computer. The detector 133 may include a hardware circuit such as an ASIC or an FPGA. The detector 133, which is a processing circuit, may include one or more processors for operating in accordance with computer programs, one or more hardware circuits such as the ASIC or the FPGA, or a combination thereof.

Object Detection Process

The detector 133 detects an object existing behind the forklift truck 10 by repeating the following object detection process in a predetermined control cycle. The detector 133 derives a position of the detected object. The position of the object is a relative position between the forklift truck 10 and the object.

Figure 4:
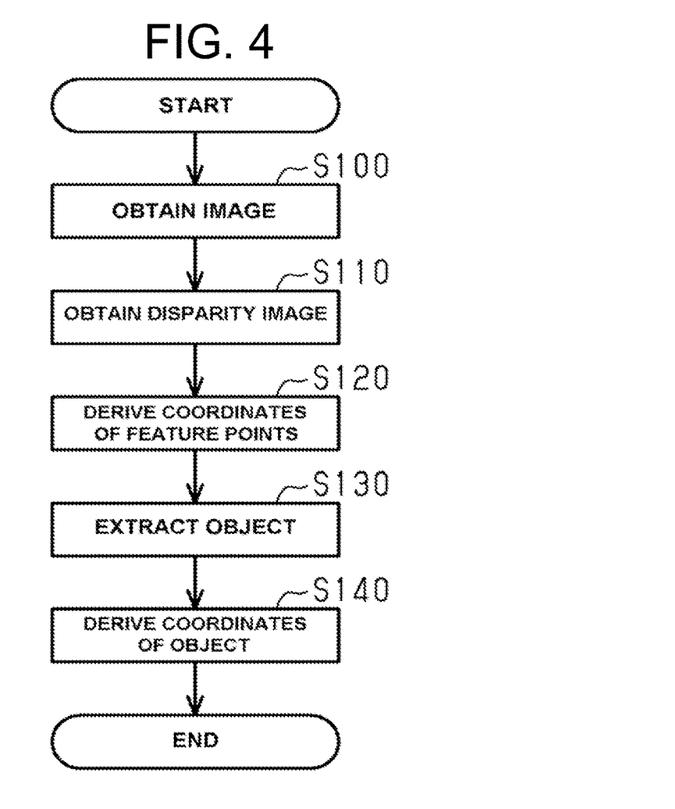
FIG. 4 is a flowchart illustrating an object detection process.

As illustrated in FIG. 4, in Step S100, the detector 133 obtains an image from the stereo camera 132.

Next, in Step S110, the detector 133 performs a stereo process to obtain a disparity image. The disparity image is an image in which a disparity [px] is associated with a pixel, and is not necessarily displayed. Two images captured by the stereo camera 132 are compared with each other, and a difference in number of pixels between the two images is calculated for the same feature point in each of the images, so that a disparity is obtained. The feature point corresponds to a point that is visually recognized as a border such as an edge of an object. The feature point is detected from information of brightness, and the like.

Next, in Step S120, the detector 133 derives coordinates of feature points in a world coordinate system that is a coordinate system in a real space. In the world coordinate system, an X-axis corresponds to an axis extending in a horizontal direction, specifically, in a vehicle width direction of the forklift truck 10, a Y-axis corresponds to an axis extending in the horizontal direction, specifically in a direction perpendicular to the X-axis, and a Z-axis corresponds to an axis extending in a vertical direction, in a state where the forklift truck 10 is positioned on a horizontal plane. After the coordinates of the feature points in a camera coordinate system are derived from a baseline length of the stereo camera 132, a focal length of the stereo camera 132, and the disparity image obtained in Step S110, such derived coordinates in the camera coordinate system are converted into coordinates in the world coordinate system to derive the coordinates of the feature points. As illustrated in FIG. 1, the X-axis, the Y-axis, and the Z-axis are represented by arrows X, Y, and Z.

As illustrated in FIG. 4, in Step S130, the detector 133 extracts an object by clustering the feature points. The detector 133 defines, as one point group, a set of feature points assumed to represent the same object among the feature points representing a part of the object, and extracts the one point group as the object. The detector 133 performs clustering to recognize the feature points positioned in a predetermined range as one point group based on the coordinates of the feature points in the world coordinate system derived in Step S120. The detector 133 recognizes the clustered point group as one object. The clustering of the feature points in Step S130 may be performed by various methods.

Next, in Step S140, the detector 133 derives coordinates of the object in the world coordinate system. The coordinates of the object can be derived from the coordinates of the feature points forming the point group. The coordinates of the object in the world coordinate system represent a relative position between the forklift truck 10 and the object. Specifically, in the coordinates of the object in the world coordinate system, an X-coordinate represents a distance from an original point to the object in the right-left direction, and a Y-coordinate represents a distance from the original point to the object in the front-rear direction. The original point corresponds to, for example, coordinates in which the X-coordinate and the Y-coordinate represent a position of the stereo camera 132 and a Z-coordinate represents the road surface. Euclidean distance from the position of the stereo camera 132 to the object may be derived from the X-coordinate and the Y-coordinate. The Z-coordinate of the coordinates of the object in the world coordinate system represents a height of the object from the road surface.

Alarm

The alarm 136 is a device that issues an alarm to the driver of the forklift truck 10. Examples of the alarm 136 include a buzzer emitting sounds, a lamp emitting lights, and combination thereof.

Control Performed by Controller

The controller 81, the travel controller 63, and the object detector 131 obtain information from each other. The controller 81, the travel controller 63, and the object detector 131 obtain the information from each other through communication in accordance with a communication protocol for the vehicle, such as CAN (Controller Area Network) or LIN (Local Interconnect Network).

The controller 81 derives the vehicle speed of the forklift truck 10. The vehicle speed of the forklift truck 10 is derived from a detection result of the vehicle speed sensor 62, a gear ratio, an outer diameter of each driving wheel 12, the steering angle detected by the steering angle sensor 86, and the like. The detection result of the vehicle speed sensor 62 is obtained from the travel controller 63. The memory 83 is simply required to pre-store the gear ratio and the outer diameter of each driving wheel 12. The controller 81 derives the travel direction of the forklift truck 10 as well as the vehicle speed of the forklift truck 10. The travel direction of the forklift truck 10 corresponds to one of a forward travel direction and a rearward travel direction.

The controller 81 transmits an alarm command to the object detector 131 to activate the alarm 136. Specifically, the object detector 131 includes an activation portion configured to activate the alarm 136 upon reception of the alarm command.

Travel Start Restriction Area

The controller 81 performs a travel start restriction control. In the travel start restriction control, when the forklift truck 10 stops, a travel start of the forklift truck 10 is restricted depending on a status of object detection by the object detector 131. The following will describe a travel start restriction area used for the travel start restriction control.

Figure 5:
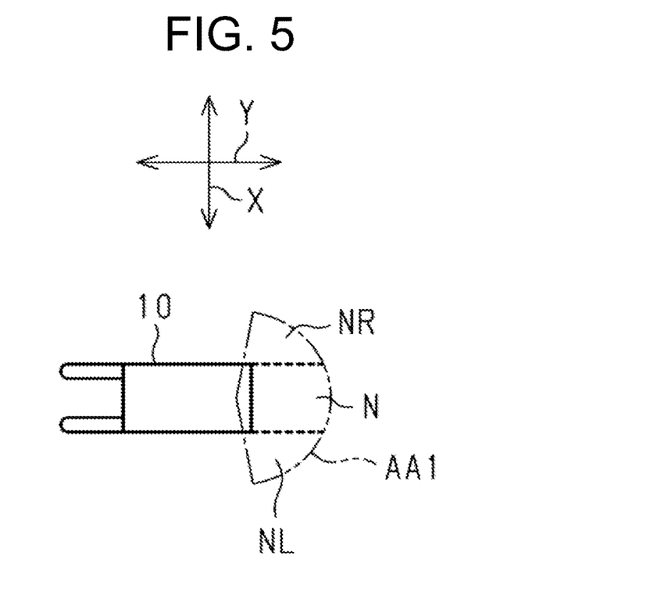
FIG. 5 is a diagram schematically illustrating a travel start restriction area.

As illustrated in FIG. 5, a travel start restriction area AA1 used for the travel start restriction control is set within an object detectable range of the object detector 131. The object detectable range of the object detector 131 corresponds to an imaging range to be captured by the stereo camera 132. The travel start restriction area AA1 extends from the position of the stereo camera 132 toward the area behind the forklift truck 10, and extends in the vehicle width direction of the forklift truck 10. The travel start restriction area AA1 is defined by the X-coordinate and the Y-coordinate in the world coordinate system.

The travel start restriction area AA1 is divided into three areas corresponding to a central area N, a left area NL positioned on the left of the central area N, and a right area NR positioned on the right of the central area N. The central area N is an area facing the forklift truck 10 in its front-rear direction. A dimension of the central area N in the right-left direction corresponds to that of the forklift truck 10 in the vehicle width direction. It can be said that the central area N is an area through which the forklift truck 10 passes while traveling straight in the rearward travel direction. It can be said that the left area NL is an area through which the forklift truck 10 passes while turning to the left in the rearward travel direction. It can be said that the right area NR is an area through which the forklift truck 10 passes while turning to the right in the rearward travel direction. A dimension of the travel start restriction area AA1 in the front-rear direction and the dimension of the travel start restriction area AA1 in the right-left direction may be adjusted arbitrarily.

Travel Start Restriction Control

Figure 6:
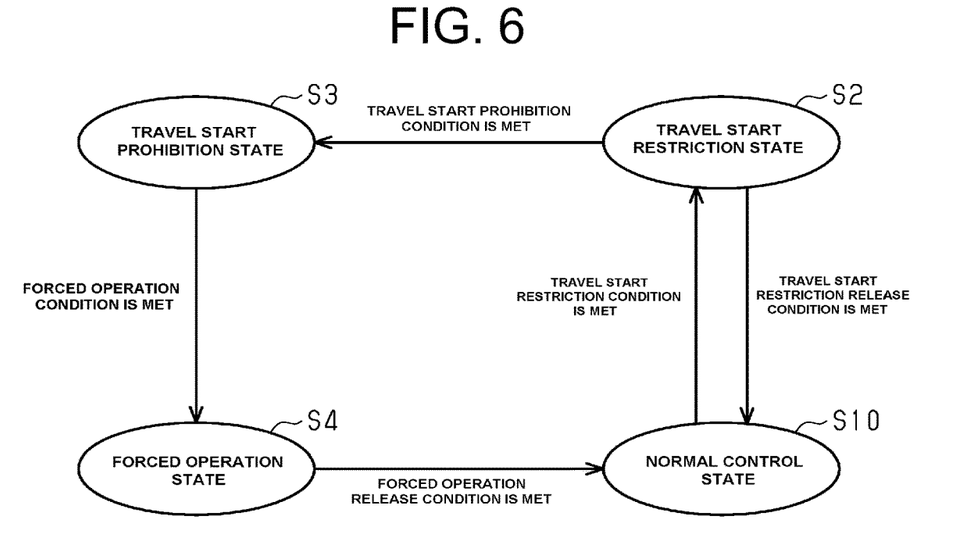
FIG. 6 is a state shifting diagram of a start restriction control.

As illustrated in FIG. 6, in the travel start restriction control, a state of the forklift truck 10 is set to one of a normal control state S10, a travel start restriction state S2, a travel start prohibition state S3, and a forced operation state S4, so that the controller 81 performs a control depending on each of the above-described states.

Normal Control State

In the normal control state S10, a vehicle speed limit is not imposed on the forklift truck 10. When the forklift truck 10 is in the normal control state S10, the controller 81 calculates a target rotational speed from an accelerator opening degree detected by the accelerator sensor 85. The target rotational speed increases as the accelerator opening degree increases. The controller 81 generates a rotational speed command based on the target rotational speed, and transmits the generated rotational speed command to the travel controller 63. The travel controller 63 controls the engine 31 so that the rotational speed follows the target rotational speed. Specifically, the travel controller 63 controls the throttle actuator 32 to adjust the throttle opening degree. As a result, the forklift truck 10 travels at the vehicle speed in accordance with the operation amount of the accelerator 84 operated by the driver. As described above, the controller 81 transmits the rotational speed command to the travel controller 63 to control the rotational speed of the engine 31, which adjusts the driving force transmitted to the driving wheels 12. Thus, the controller 81 adjusts the driving force transmitted to the driving wheels 12.

Travel Start Restriction State

In the travel start restriction state S2, a travel start from a stop state of the forklift truck 10 is restricted when an object exists in the travel start restriction area AA1. The travel start means that a state of the forklift truck 10 is shifted from the stop state to a traveling state. In the travel start restriction state S2, the vehicle speed limit may be imposed on the forklift truck 10 or the alarm 136 may issue an alarm so that the travel start of the forklift truck 10 is restricted.

Travel Start Prohibition State

In the travel start prohibition state S3, the travel start of the forklift truck 10 is prohibited. In the travel start prohibition state S3, the controller 81 performs a control in which transmission of the driving force to the driving wheels 12 is shut off. In the travel start prohibition state S3, the controller 81 causes the second forward relay 121 and the second rearward relay 122 to be in the disconnection state, which causes the power transmission 40 to be in the driving force non-transmission state. As a result, the travel system 30 is in the same state as a case where the direction lever 88 is in the neutral position. Specifically, the clutches 44, 46 are disconnected from the gear trains 45, 47, respectively and the driving force of the engine 31 is not transmitted to the power transmission 40. In the travel start prohibition state S3, the alarm issued by the alarm 136 may be emphasized further as compared with the alarm in the travel start restriction state S2. For example, when the alarm 136 is a buzzer, the buzzer may emit sounds louder as compared with sounds in the travel start restriction state S2. When the alarm 136 is a combination of a lamp and the buzzer, the alarm may be issued by both the lamp and the buzzer, instead of one of the lamp and the buzzer.

Forced Operation State

In the forced operation state S4, a speed limit imposed on the forklift truck 10 is set to a vehicle speed upper limit VS1 [km/h]. The controller 81 performs a control so that the vehicle speed of the forklift truck 10 does not exceed the vehicle speed upper limit VS1. The vehicle speed upper limit VS1 is higher than zero, and lower than the maximum reachable vehicle speed of the forklift truck 10. The vehicle speed upper limit VS1 may be set at an any value, for example, within a range between 1 [km/h] and 4 [km/h]. The controller 81 allows the forklift truck 10 to travel at the vehicle speed upper limit VS1 or less. That is, the forced operation state S4 allows the forklift truck 10 to travel with the rotational speed of the engine 31 being limited. In the present embodiment, the rotational speed of the engine 31 is limited so as not to exceed an idle rotational speed. When the rotational speed of the engine 31 is equal to the idle rotational speed, the controller 81 allows the vehicle speed to exceed the vehicle speed upper limit VS1. That is, the forced operation state S4 allows the forklift truck 10 to travel at or below one of the vehicle speed upper limit VS1 and the vehicle speed corresponding to the idle rotational speed, which is higher than the other. In the forced operation state S4, the alarm issued by the alarm 136 may be weakened further as compared with the alarm in the travel start prohibition state S3. In the forced operation state S4, the power transmission 40 is in the driving force transmission state. In the forced operation state S4, the vehicle speed upper limit VS1 [km/h] need not be set. That is, the forced operation state S4 is simply required to allow the forklift truck 10 to travel.

Shifting from Normal Control State to Travel Start Restriction State

When a start restriction condition is met with the forklift truck 10 being in the normal control state S10, the controller 81 shifts the state of the forklift truck 10 from the normal control state S10 to the travel start restriction state S2. The start restriction condition being met means that the following first restriction condition and second restriction condition are met.

| | |
|---|---|
| First Restriction Condition | An object exists in the travel start restriction area AA1. |
| Second Restriction Condition | The forklift truck 10 stops. |

Whether the first restriction condition is met is determined from an X-coordinate and a Y-coordinate of an object. Since the travel start restriction area AA1 is defined by the X-coordinate and the Y-coordinate, whether the object exists in the travel start restriction area AA1 is determined from the X-coordinate and the Y-coordinate of the object.

Whether the second restriction condition is met is determined from a vehicle speed calculated by the controller 81. When the vehicle speed is equal to or less than a stop determination threshold [km/h], the controller 81 determines that the forklift truck 10 stops. The stop determination threshold is set to any value at which the stop of the forklift truck 10 is recognized, for example, 0 [km/h] to 0.5 [km/h].

Shifting from Travel Start Restriction State to Normal Control State

When a travel start restriction release condition is met with the forklift truck 10 being in the travel start restriction state S2, the controller 81 shifts the state of the forklift truck 10 from the travel start restriction state S2 to the normal control state S10. The travel start restriction release condition being met means that at least one of the following first release condition, second release condition, third release condition, and fourth release condition is met.

| | |
|---|---|
| First Release Condition | An object does not exist in the travel start restriction area AA1. |
| Second Release Condition | The forklift truck 10 travels forward at a predetermined vehicle speed or higher. |
| Third Release Condition | The forklift truck 10 travels rearward at a predetermined vehicle speed or higher for a predetermined period of time. |
| Fourth Release Condition | The forklift truck 10 travels rearward at a predetermined vehicle speed or higher. |

The predetermined vehicle speed of the second release condition may be set to any value as long as such a value is higher than the stop determination threshold. The predetermined vehicle speed of the second release condition may be arbitrarily set within a range between 1 [km/h] and 2 [km/h], for example.

The predetermined vehicle speed of the third release condition may be set to any value as long as such value is higher than the stop determination threshold. The predetermined vehicle speed of the third release condition is arbitrarily set within a range between 1 [km/h] and 2 [km/h], for example. The predetermined period of time of the third release condition may be set to any value. The predetermined period of time of the third release condition may be arbitrarily set within a range between one second and two seconds, for example.

The predetermined vehicle speed of the fourth release condition may be set to any value as long as such value is higher than the predetermined vehicle speed of the third release condition. The predetermined vehicle speed of the fourth release condition may be arbitrarily set within a range between 3 [km/h] and 5 [km/h], for example.

Shifting from Travel Start Restriction State to Travel Start Prohibition State

When a travel start prohibition condition is met with the forklift truck 10 being in the travel start restriction state S2, the controller 81 shifts the state of the forklift truck 10 from the travel start restriction state S2 to the travel start prohibition state S3. The travel start prohibition condition being met means that all the following first prohibition condition, second prohibition condition, and third prohibition condition are met. When both the travel start prohibition condition and the travel start restriction release condition are met with the forklift truck 10 being in the travel start restriction state S2, the controller 81 prioritizes the travel start restriction release condition, and shifts the state of the forklift truck 10 to the normal control state S10.

| | |
|---|---|
| First Prohibition Condition | An object exists in a scheduled travel area of the forklift truck 10. |
| Second Prohibition Condition | The forklift truck 10 stops. |
| Third Prohibition Condition | The direction lever 88 is in the rearward position. |

Whether the first prohibition condition is met is determined from the detection result of the steering angle sensor 86 and the X-coordinate and the Y-coordinate of the object. The scheduled travel area of the forklift truck 10 is an area to which the forklift truck 10 is expected to travel, among the central area N, the left area NL, and the right area NR. When the steering angle of each steering wheel 14 detected by the steering angle sensor 86 is equal to or greater than a predetermined angle in a left turn direction, it is determined that the forklift truck 10 turns left. When the steering angle of each steering wheel 14 detected by the steering angle sensor 86 is equal to or greater than a predetermined angle in a right turn direction, it is determined that the forklift truck 10 turns right. The predetermined angle used for determining whether the forklift truck 10 turns left or right is arbitrarily set within a range between 4° and 6°. When the steering angle of each steering wheel 14 detected by the steering angle sensor 86 is less than a predetermined angle, it is determined that the forklift truck 10 travels straight. When the forklift truck 10 travels straight, the scheduled travel area corresponds to the central area N. When the forklift truck 10 turns left, the scheduled travel area corresponds to the left area NL and the central area N. When the forklift truck 10 turns right, the scheduled travel area corresponds to the right area NR and the central area N. When the scheduled travel area matches the areas N, NL, NR where an object exists, the controller 81 determines that the first prohibition condition is met. When a single object is positioned over the areas N, NL, NR, or when a plurality of objects is positioned in the areas N, NL, NR, the controller 81 determines that an object exists in each of the areas N, NL, NR. In this case, when one of the areas N, NL, NR where the object exists matches the scheduled travel area, the controller 81 determines that the first prohibition condition is met.

The second prohibition condition is the same condition as the second restriction condition.

When the voltage is inputted from the direction switch 90 to the controller 81, the controller 81 determines that the third prohibition condition is met.

A case where the first prohibition condition and the third prohibition condition are met corresponds to a case where the object detector 131 detects an object existing behind the forklift truck 10 and where the travel direction determined by the direction lever 88 is the rearward travel direction. That is, the detection direction of the object matches the travel direction determined by the direction lever 88. The controller 81 causes the forklift truck 10 to be in the travel start prohibition state S3, when the object detector 131 detects the object and the detection direction of the object matches the travel direction determined by the direction lever 88, in a case where the vehicle speed of the forklift truck 10 is equal to or less than the stop determination threshold.

Shifting from Travel Start Prohibition State to Forced Operation State

When a forced operation condition is met with the forklift truck 10 being in the travel start prohibition state S3, the controller 81 shifts the state of the forklift truck 10 from the travel start prohibition state S3 to the forced operation state S4. That is, the controller 81 releases the travel start prohibition state S3 and shifts the state of the forklift truck 10 to the forced operation state S4.

| | |
|---|---|
| Forced Operation Condition | The direction lever 88 is in the neutral position, and the rotational speed of the engine 31 is less than a predetermined rotational speed. |

In the travel start prohibition state S3, the direction lever 88 is in the rearward position. It can be said that the travel direction determined by the direction lever 88 is changed when the direction lever 88 is in the neutral position. Such a change of the travel direction determined by the direction lever 88 includes a change from a state where the travel direction of the forklift truck 10 indicates the rearward travel direction to a state where the forklift truck 10 does not travel. The predetermined rotational speed is set so that a sudden travel start of the forklift truck 10 is prevented when the state of the forklift truck 10 is shifted from the travel start prohibition state S3 to the forced operation state S4. Examples of the predetermined rotational speed include a rotational speed obtained by adding 100 to 200 [rpm] to the idle rotational speed, for example.

Shifting from Forced Operation State to Normal Control State

When a forced operation release condition is met with the forklift truck 10 being in the forced operation state S4, the controller 81 shifts the state of the forklift truck 10 from the forced operation state S4 to the normal control state S10.

| | |
|---|---|
| Forced Operation Release Condition | The direction lever 88 is in the forward position. |

The forced operation release condition may be a travel stop of the forklift truck 10. The travel stop means that a state where the vehicle speed of the forklift truck 10 is higher than the stop determination threshold is shifted to a state where the vehicle speed of the forklift truck 10 is equal to or less than the stop determination threshold.

In the forklift truck 10 being in the forced operation state S4, even when the direction lever 88 is in the rearward position, the controller 81 does not shift the state of the forklift truck 10 to the travel start prohibition state S3. That is, while the forklift truck 10 is in the forced operation state S4, the controller 81 maintains the forced operation state S4 even when the travel direction determined by the direction lever 88 is returned to the travel direction before the release of the travel start prohibition state S3, after the release of the travel start prohibition state S3.

Operation

The following will describe an operation of the present embodiment.

When the first to third prohibition conditions are met in the travel start restriction state S2, the state of the forklift truck 10 is shifted to the travel start prohibition state S3. A case where the first to third prohibition conditions are met corresponds to a case where the object detector 131 detects an object and where the detection direction of the object matches the travel direction determined by the direction lever 88. For example, when the third prohibition condition is set to a case where the accelerator 84 is not operated, the accelerator 84 is operated after determination of the travel direction by the direction lever 88 in the forklift truck 10. When the third prohibition condition is set to the case where the accelerator 84 is not operated, the state of the forklift truck 10 is not shifted from the travel start restriction state S2 to the travel start prohibition state S3 at a time at which the direction lever 88 is in the rearward position. This may cause the travel start of the forklift truck 10 due to a creep phenomenon. On the other hand, in the present embodiment, the third prohibition condition is set such that the direction lever 88 is in the rearward position. Thus, when the direction lever 88 is in the rearward position, the state of the forklift truck 10 is shifted from the travel start restriction state S2 to the travel start prohibition state S3. Then, in the travel start prohibition state S3, the power transmission 40 is in the driving force non-transmission state, so that the driving force is shut off.

Effects

The following will describe effects of the present embodiment.

(1) In the travel start prohibition state S3, the power transmission 40 is in the driving force non-transmission state, so that the creep phenomenon does not occur. Thus, the travel start of the forklift truck 10 due to the creep phenomenon is suppressed. This suppresses a contact between the object and the forklift truck 10.

(2) When the forced operation condition is met with the forklift truck 10 being in the travel start prohibition state S3, the controller 81 releases the travel start prohibition state S3 and shifts the state of the forklift truck 10 to the forced operation state S4. While the forklift truck 10 is in the forced operation state S4, the controller 81 maintains the forced operation state S4 even when the travel direction determined by the direction lever 88 is returned to the travel direction before the release of the travel start prohibition state S3 after the release of the travel start prohibition state S3. In the present embodiment, the direction lever 88 is in the rearward position until the travel start prohibition state S3 is released in response to the direction lever 88 being changed to the neutral position. The forced operation state S4 is maintained even in a case where the direction lever 88 is returned to the rearward position after the travel start prohibition state S3 is released in response to the direction lever 88 being changed to the neutral position. The forced operation state S4 allows the forklift truck 10 to travel. Therefore, even when an object exists in the travel start restriction area AA1, the forklift truck 10 starts to travel. This suppresses deterioration of work efficiency.

(3) The forced operation state S4 allows the forklift truck 10 to travel at the vehicle speed upper limit VS1 or less. In the forced operation state S4, the object is likely to exist in the travel start restriction area AA1. In this case, the vehicle speed upper limit VS1 is set, so that the forklift truck 10 starts to travel in a state where a contact between the object and the forklift truck 10 is suppressed.

(4) In the forklift truck 10 being in the travel start prohibition state S3, when the direction lever 88 is in the neutral position and the rotational speed of the engine 31 is less than the predetermined rotational speed, the controller 81 causes the state of the forklift truck 10 to the forced operation state S4. This prevents the forklift truck 10 in a state where the rotational speed of the engine 31 is equal to or higher than the predetermined rotational speed from being in the forced operation state S4. In the forced operation state S4, the forklift truck 10 is allowed to travel. Thus, the forklift truck 10 may start to travel suddenly when the state of the forklift truck 10 is shifted to the forced operation state S4 in a state where the rotational speed of the engine 31 is equal to or higher than the predetermined rotational speed. The state of the forklift truck 10 is shifted to the forced operation state S4 when the rotational speed of the engine 31 is less than the predetermined rotational speed, which suppresses the sudden travel stat of the forklift truck 10 and also suppresses an excessive driving force to the power transmission 40. As a result, a load on the power transmission 40 is reduced.

(5) The forced operation state S4 allows the forklift truck 10 to travel with the rotational speed of the engine 31 being limited. In the forced operation state S4, an object may exist in the travel start restriction area AA1. Thus, the rotational speed of the engine 31 is limited, which prevents the forklift truck 10 traveling at the high vehicle speed from passing near the object.

When the forklift truck 10 continues to travel at the vehicle speed upper limit VS1 or less, the rotational speed of the engine 31 is reduced, which may cause an engine stall. When the rotational speed of the engine 31 corresponds to the idle rotational speed, the forklift truck 10 is allowed to travel at a vehicle speed higher than the vehicle speed upper limit VS1, which prevents the engine stall.

Modified Embodiment

The embodiment can be modified and implemented as follows. The embodiment and the following modified embodiments can be implemented in combination with each other to the extent that there is no technical contradiction.

Figure 7:
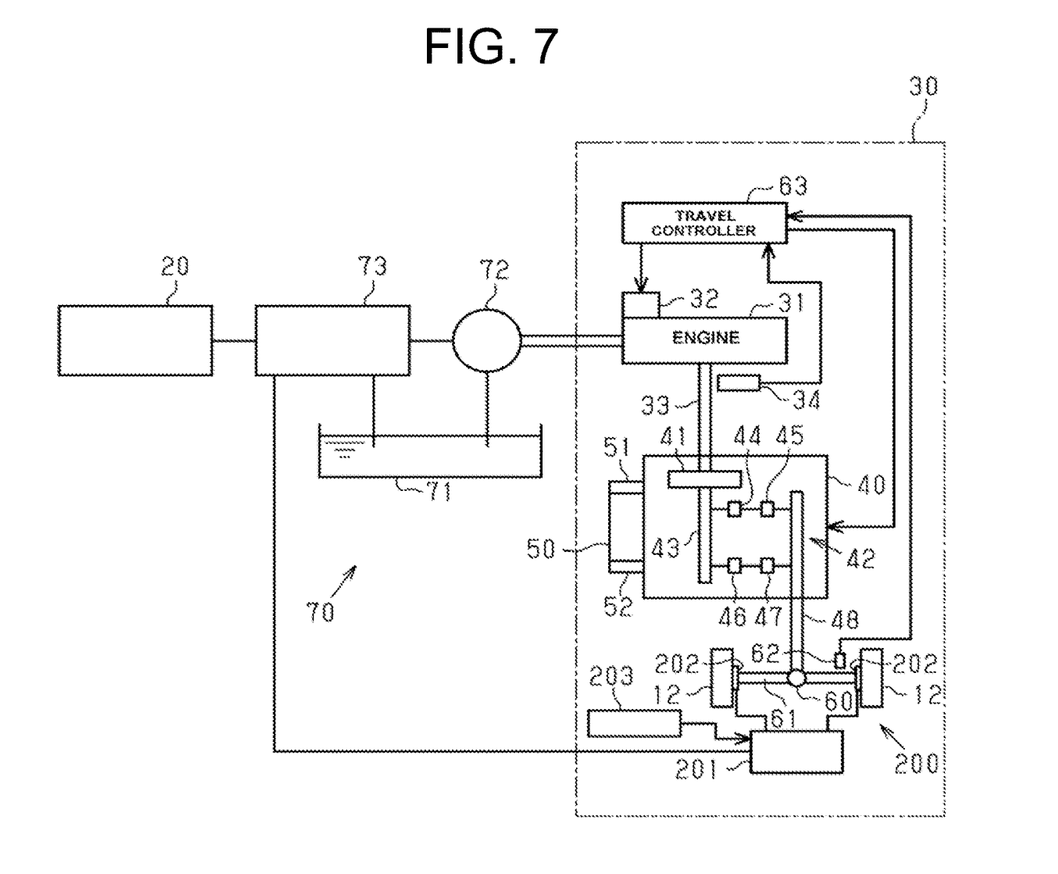
FIG. 7 is a schematic block diagram of a forklift truck according to a modified embodiment.

As illustrated in FIG. 7, the travel system 30 may include a brake mechanism 200. The brake mechanism 200 includes a brake actuator 201, brake wheel cylinders 202, and a brake controller 203.

The brake actuator 201 is an actuator that controls hydraulic oil to be supplied to the brake wheel cylinders 202. The brake actuator 201 controls the supply of the hydraulic oil with a solenoid valve, for example.

The brake wheel cylinders 202 are provided in the driving wheels 12, respectively. The brake wheel cylinders 202 may be provided in the steering wheels 14, respectively. The brake wheel cylinders 202 press a brake pad against a brake disc with the hydraulic fluid supplied from the brake actuator 201 to generate a friction braking force.

A hardware configuration of the brake controller 203 is the same as that of the travel controller 63, for example. The brake controller 203 controls the brake actuator 201 upon reception of a command from the controller 81. Thus, the controller 81 controls the brake mechanism 200 by transmitting the command to the brake controller 203.

In the travel start prohibition state S3, the controller 81 may apply the braking force to the forklift truck 10 by controlling the brake mechanism 200, instead of a control in which the power transmission 40 is switched to the driving force non-transmission state. This suppresses the travel start of the forklift truck 10 due to the creep phenomenon. The controller 81 may apply the braking force to the forklift truck 10 by controlling the brake mechanism 200, in addition to the control in which the power transmission 40 is switched to the driving force non-transmission state in the travel start prohibition state S3.

When the forklift truck 10 is in the travel start prohibition state S3, the controller 81 may perform a control in which the power transmission 40 is switched to the driving force non-transmission state by each of the first forward relay 111 and the first rearward relay 112 being in the disconnection state. In this case, the forklift truck 10 need not include the second forward relay 121 and the second rearward relay 122.

When the forklift truck 10 is in the travel start prohibition state S3, the controller 81 may use an inching valve to switch the power transmission 40 to the driving force non-transmission state. The inching valve performs adjustment such that the driving force of the engine 31 is distributed to the power transmission 40 or to the hydraulic pump 72. The inching valve may be used to prevent the driving force of the engine 31 from being distributed to the power transmission 40, so that the power transmission 40 is switched to the driving force non-transmission state. Any means may be used as long as the rotational speed of the engine 31 is controlled to adjust the driving force transmitted to the driving wheels 12. For example, a first throttle valve may be used for controlling the rotational speed of the engine 31. The first throttle valve is controlled by the throttle actuator 32 of the above-described embodiment. Then, the engine 31 may include a second throttle valve that is different from the first throttle valve. The second throttle valve is disposed in the intake passage in series. The controller 81 may reduce an opening degree of the second throttle valve when the power transmission 40 is switched to the driving force non-transmission state.

The power transmission 40 may be switchable between the driving force transmission state and the driving force non-transmission state upon reception of the command from the controller 81. In this case, when the forklift truck 10 is in the travel start prohibition state S3, the controller 81 may give the power transmission 40 the command so that the power transmission 40 is in the driving force non-transmission state.

The first prohibition condition may correspond to a state where "an object exists in the travel start restriction area AA1". The travel start restriction area AA1 extends toward an area behind the forklift truck 10 from the position of the stereo camera 132. Thus, even in a case where the first prohibition condition is set as described above, when the first prohibition condition and the third prohibition condition are met, it can be said that the object detector 131 detects an object existing behind the forklift truck 10 and the travel direction determined by the direction lever 88 corresponds to the rearward travel direction.

The forced operation condition may be modified into one of the following conditions. The forced operation condition may be a combination of the forced operation condition of the above-described embodiment and the following forced operation conditions. In the combination of a plurality of forced operation conditions, when at least one of the plurality of forced operation conditions is met, the controller 81 may shift the state of the forklift truck 10 to the forced operation state S4.

| | |
|---|---|
| Forced Operation Condition | The direction lever 88 is in the neutral position, and the accelerator 84 is not operated. |
| Forced Operation Condition | The direction lever 88 is changed from the neutral position to the rearward position in a state where the accelerator 84 is not operated. |

Even when the forced operation condition is modified as described above, shifting of the state of the forklift truck 10 to the forced operation state S4 with the engine 31 rotating at a high speed is suppressed. For example, the forced operation condition is set to a case where the direction lever 88 is changed from the neutral position to the rearward position in a state of the acceleration being OFF. In this case, when the direction lever 88 is changed to the rearward position in the state of the acceleration being OFF, the state of the forklift truck 10 is shifted to the forced operation state S4. This prevents the direction lever 88 from being changed to the rearward travel position in the state where the rotational speed of the engine 31 increases by the acceleration being ON before the direction lever 88 is in the rearward position. Therefore, it is possible to further prevent the state of the forklift truck 10 with a high rotational speed of the engine 31 from being shifted to the forced operation state S4.

The forced operation condition may correspond to "the direction lever 88 is in the neutral position".

The forced operation condition may correspond to "the direction lever 88 is in the forward position". As described above, the change of the travel direction determined by the direction lever 88 includes a change from the rearward travel direction to the forward travel direction.

In the forced operation state S4, the rotational speed of the engine 31 may be limited so as not to exceed a rotational speed limit. The rotational speed limit is higher than the idle rotational speed.

The controller 81 may transmit a torque command to the travel controller 63, instead of the rotational speed command. The torque command includes a target torque. The controller 81 sets a higher target torque as the accelerator opening degree increases. The travel controller 63 controls the throttle actuator 32 so that the torque of the engine 31 follows the target torque.

The object detector 131 may detect a position of an object existing in the forward travel direction of the forklift truck 10. In this case, the stereo camera 132 faces an area in front of the forklift truck 10. When the object detector 131 detects the position of the object existing in the forward travel direction of the forklift truck 10, the travel start restriction area AA1 corresponds to the area extending forward from the forklift truck 10. In this case, in the travel start restriction control, the front and rear directions in the above-described embodiment are reversed.

The object detector 131 may be any device capable of detecting a position of an object existing in any of the rearward travel direction and the forward travel direction of the travel direction of the forklift truck 10. For example, the object detector 131 may include a stereo camera for the forward travel and a stereo camera for the rearward travel, or a fisheye camera. In this case, the travel start restriction area AA1 includes a front area extending forward from the forklift truck 10 and a rear area extending rearward from the forklift truck 10. When the forklift truck 10 stops with the direction lever 88 being in the forward position and an object exists in the front area, the controller 81 may allow the forklift truck 10 to be in the travel start prohibition state S3. When the forklift truck 10 stops with the direction lever 88 being in the rearward position and an object exists in the rear area, the controller 81 may allow the forklift truck 10 to be in the travel start prohibition state S3.

The travel direction determiner may be any device as long as the driver of the forklift truck 10 can use it to operate the forklift truck 10. The travel direction determiner may be a push button, for example.

The object detector 131 may use a Time of Flight camera (ToF), a Laser Imaging Detection and Ranging (LIDAR), a millimeter wave radar, or the like, instead of the stereo camera 132. The object detector 131 may include a combination of a plurality of sensors such as the stereo camera 132 and the LIDAR.

The alarm 136 may be included in any device other than the object detector 131.

The alarm 136 may be operated directly by the controller 81.

The operation of the forklift truck 10 may be switched between an automatic operation and a manual operation.

The engine-type industrial vehicle may be any vehicle that is used for works in a limited area, such as a towing vehicle used for transporting cargos or an order picker used for picking work. That is, the engine-type industrial vehicle need not be equipped with the cargo handling apparatus 20 for unloading and loading.

What is claimed is:

1. An engine-type industrial vehicle comprising:
   an engine;
   a power transmission configured to transmit a driving force of the engine to a driving wheel; and
   a controller configured to adjust the driving force transmitted to the driving wheel, wherein
   the engine-type industrial vehicle includes:
      a travel direction determiner configured to determine a travel direction of the engine-type industrial vehicle based on an operation of the travel direction determiner by a driver of the engine-type industrial vehicle; and
      an object detector configured to detect a position of an object existing in the travel direction of the engine-type industrial vehicle,
   the power transmission is switchable between a driving force transmission state where the driving force of the engine is transmitted to the power transmission and a driving force non-transmission state where the driving force of the engine is not transmitted to the power transmission,
   the controller causes a state of the engine-type industrial vehicle to be in a travel start prohibition state, when the object detector detects the object and a detection direction of the object matches the travel direction determined by the travel direction determiner, in a case where a vehicle speed of the engine-type industrial vehicle is equal to or less than a stop determination threshold,
   the travel start prohibition state includes at least one of a state where the power transmission is in the driving force non-transmission state and a state where a braking force is applied to the engine-type industrial vehicle, and
   the controller is configured to determine that a switchback operation is performed when the travel direction instructed by the travel direction determiner does not coincide with the travel direction of the engine-type industrial vehicle, and switch the power transmission to be in the driving force non-transmission state based on a determination that the switchback operation is performed.

2. The engine-type industrial vehicle according to claim 1, wherein when the engine-type industrial vehicle is in the travel start prohibition state, the controller releases the travel start prohibition state and shifts the state of the engine-type industrial vehicle to a forced operation state in response to a change of the travel direction determined by the travel direction determiner, while the engine-type industrial vehicle is in the forced operation state, the controller maintains the forced operation state even when the travel direction determined by the travel direction determiner is returned to the travel direction before the release of the travel start prohibition state, after the release of the travel start prohibition state, and the forced operation state allows the engine-type industrial vehicle to travel.

3. The engine-type industrial vehicle according to claim 2, wherein the forced operation state allows the engine-type industrial vehicle to travel at a vehicle speed upper limit or less.

4. The engine-type industrial vehicle according to claim 2, wherein while the engine-type industrial vehicle is in the travel start prohibition state, the controller releases the travel start prohibition state and shifts the state of the engine-type industrial vehicle to the forced operation state in response to a change of the travel direction determined by the travel direction determiner and in a case of a rotational speed of the engine being less than a predetermined rotational speed.

5. The engine-type industrial vehicle according to claim 2, wherein the forced operation state allows the engine-type industrial vehicle to travel with the rotational speed of the engine being limited.

6. An engine-type industrial vehicle comprising:
an engine;
a power transmission configured to transmit a driving force of the engine to a driving wheel;
at least one memory configured to store computer program code; and
at least one processor configured to access the at least one memory and operate as instructed by the computer program code, the at least one processor configured to execute the computer program code to adjust the driving force transmitted to the driving wheel, wherein the engine-type industrial vehicle includes:
a travel direction determiner configured to determine a travel direction of the engine-type industrial vehicle based on an operation of the travel direction determiner by a driver of the engine-type industrial vehicle; and
an object detector configured to detect a position of an object existing in the travel direction of the engine-type industrial vehicle, the power transmission is switchable between a driving force transmission state where the driving force of the engine is transmitted to the power transmission and a driving force non-transmission state where the driving force of the engine is not transmitted to the power transmission, the at least one processor executes the computer program code to cause a state of the engine-type industrial vehicle to be in a travel start prohibition state, when the object detector detects the object and a detection direction of the object matches the travel direction determined by the travel direction determiner, in a case where a vehicle speed of the engine-type industrial vehicle is equal to or less than a stop determination threshold, and the travel start prohibition state includes at least one of a state where the power transmission is in the driving force non-transmission state and a state where a braking force is applied to the engine-type industrial vehicle, and the at least one processor executes the computer program code to determine that a switchback operation is performed when the travel direction instructed by the travel direction determiner does not coincide with the travel direction of the engine-type industrial vehicle, and switch the power transmission to be in the driving force non-transmission state based on a determination that the switchback operation is performed.

* * * * *